INVENTOR.
Joseph G. Zubaty,
Dimitar Toschkoff,
& Harold A. Haven
BY
C. L. Spencer
ATTORNEY

INVENTOR.
Joseph G. Zubaty,
Dimitar Toschkoff,
& Harold A. Haven

BY C. L. Spencer

ATTORNEY

United States Patent Office 3,108,437
Patented Oct. 29, 1963

3,108,437
HYDRAULIC TRANSMISSION
Joseph G. Zubaty and Dimitar Toschkoff, Flint, and Harold A. Haven, Fenton, Mich., assignors to General Motors Corporation, Detroit, Mich., a corporation of Delaware
Filed Feb. 14, 1961, Ser. No. 89,287
18 Claims. (Cl. 60—53)

This invention relates to variable speed drives and more particularly to a hydraulic drive for driving the fan and other engine accessories, such as a generator, power steering pump, air conditioning compressor and the like at a substantially constant speed throughout a wide variation of engine speed in order to minimize wear on the accessories, reduce power consumption and noise. At the same time the drive arrangement accomplishes efficient drive of the accessories at relatively low engine speeds in order that the accessories may perform their intended function at such relatively low engine speeds.

An object of this invention is to provide a hydraulic accessory drive constructed and arranged to automatically reduce the accessory speed relative to engine speed as the engine speed increases.

Another object of this invention is to provide a hydraulic accessory drive unit incorporating automatically operable flow control mechanism for progressively decreasing the speed of rotation of the output relative to the speed of rotation of the input member as the speed of rotation of the input member increases.

A further object of this invention is to provide an accessory drive unit including a pump and a hydraulic motor driven by the pump and incorporating flow control mechanism responsive to increasing speed of rotation of the motor to decrease the fluid supplied to the motor to limit the speed of rotation of the motor.

An additional object of this invention is to provide an accessory drive unit of compact design incorporating a pump and motor arranged in concentric relationship with respect to each other and incorporating speed responsive mechanism for progressively by-passing the pump output to pump suction as the speed of rotation of the motor increases to thereby limit the speed of rotation of the motor.

A still further object of this invention is to provide a hydraulic accessory drive of the type described wherein the relative speed of rotation of the engine and the accessories is changed gradually and smoothly and without the engagement of any friction clutches or brakes.

According to a feature of the invention, an engine driven vane type motor are concentrically arranged with a single cam ring having opposed cam surfaces contacting the vanes of the pump and motor respectively, and a flow control plate controlled by fluid drag which varies with changes in motor speed progressively by-passes pump discharge fluid to pump suction as the speed of rotation of the motor increases in order to limit the maximum speed of rotation of the motor and accessories.

These and other objects and advantages of this invention will be apparent from the following description and claims, taken in conjunction with the following drawings, in which:

Figure 1:
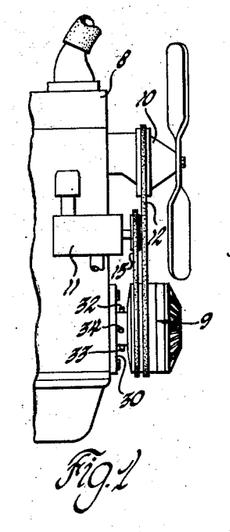
FIGURE 1 is a diagrammatic side view of an engine equipped with a variable speed drive unit constructed in accordance with the principles of this invention.

Referring to FIGURE 1 there is shown a constant speed drive mechanism adapted for use in connection with vehicle engine driven accessories, such as, for example a fan, a generator, an air compressor, a refrigerant compressor, a power steering hydraulic pump or others. In FIGURE 1, a drive unit 9 comprises the power input unit for driving a vehicle engine cooling fan 10 and a generator 11 by means of a belt 12 and a belt 13, respectively. Power unit 9 is driven by engine 8 and delivers power to the engine accessories.

Figure 2:
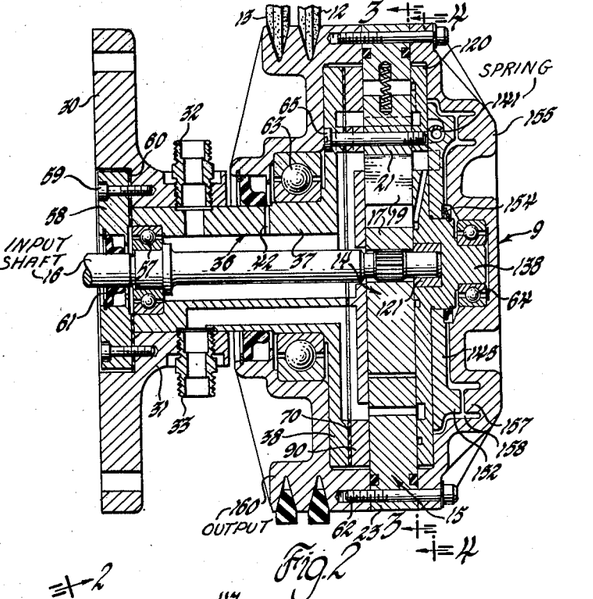
FIGURE 2 is an axial section through the accessory drive unit.

In FIGURE 2, drive mechanism 9 is illustrated as being composed of a hydraulic vane-type pump 14 and a vane-type motor 15 adapted to be driven by pump 14. A power input shaft 16 driven at engine speed by engine 8 has splined thereto for rotation therewith a pump rotor 17 having seven equally spaced slots 18, best shown in FIGURE 3, each slot having a pump vane 19 disposed therein. The external periphery of each vane 19 contacts an inner cam surface 20 of a rotor ring 21 having inner and outer cam surfaces 20 and 22, respectively, thereon. A motor vane housing 23 disposed in coaxial relationship with rotor 17 and rotor ring 21 contains twelve slots 24, each slot having a motor vane 25 slidably supported therein and biased by a spring 26 into contact with outer cam surface 22 of ring 21. As hereafter more particularly explained, pump vanes 19 are forced outwardly in slots 18 and into contact with inner cam surface 20 by means of hydraulic pressure. Rotor ring 21 is fixed against rotation. It will be understood therefore that pump vanes 19 will follow the contour of cam surface 20 upon rotation of pump rotor 17 and that motor vanes 25 will follow the contour of cam surface 22 upon rotation of motor housing 23.

Figure 5:
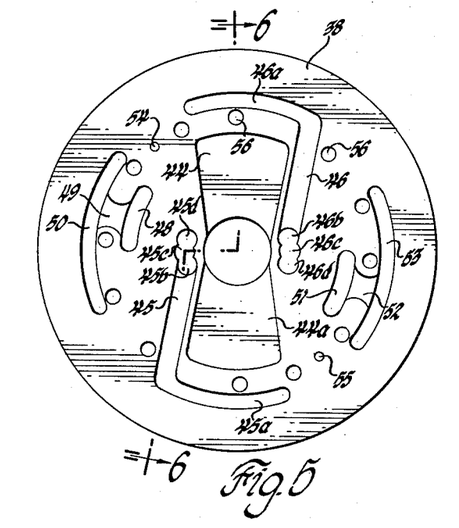
FIGURE 5 is an end view of a shaft housing plate illustrating the passages through the plate and recess channels formed on one surface of the plate.
Figure 6:
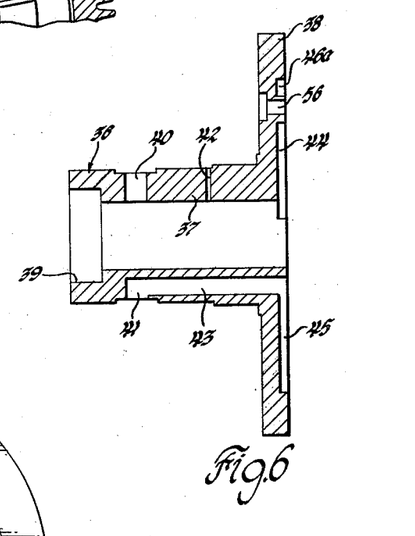
FIGURE 6 is a sectional view taken along the line 6—6 of FIGURE 5.

Referring further to FIGURE 2, a support housing 30 bolted to engine 8 as shown in FIGURE 1, serves to support the fan drive assembly on the engine. A hollow axially extending sleeve 31 on housing 30 is drilled to accommodate a plurality of ball sleeve type tube unions utilized to provide hydraulic connections for the constant speed drive unit. In FIGURE 2, two such unions 32 and 33 are shown. A second set of such unions, not shown, disposed at an angle of 90 degrees from unions 32 and 33 is also employed. Union 32 comprises an oil inlet connection and union 33 an oil outlet connection for the assemblies. These unions may be connected to an oil sump or supply such as, for example, the engine crankcase by means of suitable tubing, not shown. In FIGURE 1, a third union 34, which comprises one of the second sets of unions is shown. The second union of the second set, not shown, extends outwardly on the side of the assembly opposite from union 34. A shaft housing 36 shown in detail in FIGURES 5 and 6 comprises a hollow sleeve portion 37 having an upstanding plate 38 thereon. Sleeve 37 is recessed at 39 to receive a ball bearing 57, is drilled to provide radial passages 40, 41 and 42, and an axial passage 43. Plate 38 is recessed to provide radially extending recesses or passages 44 and 45. As shown particularly in FIGURE 5, recess passage 44 on plate 38 extends both above and below the centerline of the housing as indicated at 44 and 44a, the portions 44 and 44a being in hydraulic communication with each other. An arcuate recess passage 46a in the face of plate 38 is connected to three overlapping drilled holes 46b, 46c, 46d by means of a connecting recess passage 46. A similar arcuate shaped recess passage 45a is connected to three overlapping holes 45b, 45c, 45d by means of a recess passage 45 in plate 38. A pair of spaced arcuate recess passages 48 and 50 are connected by a recess 49 in plate 38, and a similar pair of spaced arcuate recess passages 51 and 53 are connected by a recess 52 formed in plate 38. A pair of dowel pin holes 54 and 55 extend clear through plate 38, as do a plurality (12 in number) of drilled holes 56 adapted to receive assembly bolts 65 of FIGURE 2.

Referring back to FIGURE 2, drive shaft 16 is rotatably supported in shaft housing sleeve portion 37 by means of a roller bearing 57 disposed in recess 39 of sleeve 37, the bearing being held in place by means of an end plate 58 removably secured to support housing 30 by bolts 59. A gasket 60 is disposed between end plate 58 and a seal 61 prevents oil leakage along input shaft 16. A power delivery pulley 160, motor vane housing 23 and a cover 155 bolted together for rotation as a unit by means of a plurality of bolts 62 are supported for rotation by means of a ball bearing 63 on the outer surface of sleeve 37 and a ball bearing 64. Passage 42 is an oil return connecting bearing 63 to the bore through shaft housing 36.

Figures 7, 8, 9:
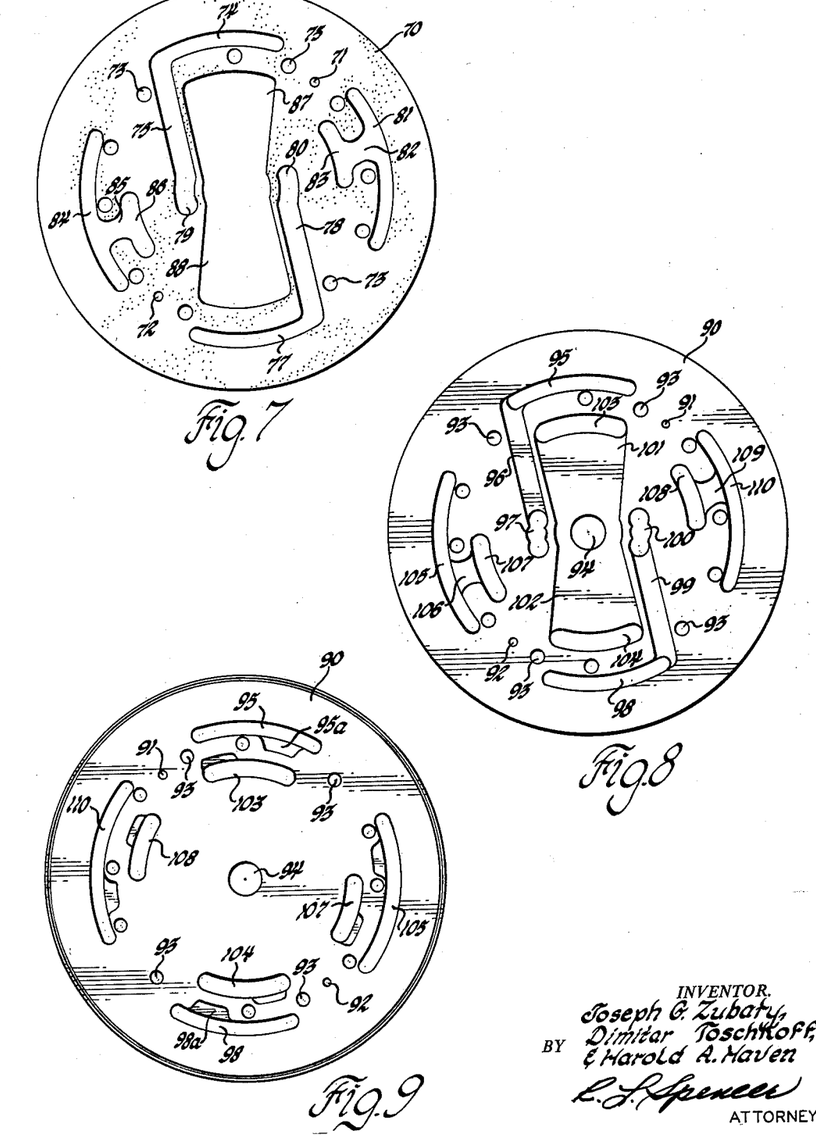
FIGURE 7 is an end view of a gasket illustrating the passages extending through the gasket.
FIGURE 8 is an end view of a rotor housing front plate illustrating the passages extending through the plate and the recess channels formed on one surface of the plate.
FIGURE 9 is an end view of the rotor housing front plate of FIGURE 8 illustrating the surface of the plate opposite to that shown in FIGURE 8 and the passages extending through the plate.

A gasket 70 shown in detail in FIGURE 7 is disposed between housing plate 38 and a rotor housing front plate 90 shown in detail in FIGURES 8 and 9. Gasket 70 is provided with a series of openings extending completely through the gasket and adapted to be disposed in alignment with the various oil transfer passages of plate 38. A pair of dowel pin holes 71—72 are aligned with dowel pin holes 54—55 of plate 38. A series of holes 73 are for alignment with holes 56 of plate 38 to receive assembly bolts 65 shown in FIGURE 2. An arcuate passage 74 connected to an inwardly extending passage 75 is disposed coincident to passage 46a and passage 46 of FIGURE 5 when the gasket is arranged in the assembly. An arcuate passage 77 connected to an inwardly extending passage 78 is disposed coincident to passage 45a and passage 45 of FIGURE 5. The inner end 79 of passage 75 is disposed coaxial with holes 46b, 46c and 46d and the inner end 80 of passage 78 is coincident with holes 45b, 45c, 45d. Arcuate shaped passages 81, 83, joined by opening 82 are coincident to passages 50, 48 and 59 of FIGURE 5 and arcuate passages 84, 86, 85 are coincident to passages 53, 51, 52 of FIGURE 5. Holes 54 and 55 of FIGURE 5 and holes 71—72 of FIGURE 7 constitute dowel pin holes whereby the corresponding passages of the assembly may be quickly disposed in coincidence to assure rapid and proper assembly of the parts. Passages 87 and 88 cut through gasket 70 will lie adjacent passages 44 and 44a of FIGURE 5.

A rotor housing front plate 90 shown in detail in FIGURES 8 and 9 is disposed in the assembly shown in FIGURE 2 with the face of the plate shown in FIGURE 8 adjacent gasket 70 and the face of the plate shown in FIGURE 9 adjacent the pump and motor of FIGURE 2. Plate 90 is provided with dowel pin holes 91 and 92 extending therethrough and with a series of through holes 93 corresponding to holes 73 of gasket 70 and holes 56 in plate 38, FIGURE 5. A central opening 94 permits drive shaft 16 to extend through plate 90. An arcuate through passage 95 connected to a recess passage 96 terminating at 97 is positioned such that in the assembly passage 95 is coincident with passage 74, passage 96 is coincident with passage 75, and terminal portion 97 is coincident with passage 79 of gasket 70 of FIGURE 7. Passage 95 extends entirely through plate 90 as indicated in FIGURE 9. Passage 96—97 comprises a channel or recess on plate 90 which exists on one surface of the plate but does not extend through the plate. In like manner, an arcuate passage 98 which extends through the plate is connected to a recess channel 99—100 formed on the surface of the plate. A recess channel 101—102 formed on the surface of plate 90 terminates in spaced arcuate passages 103—104 which extend entirely through the plate. Arcuate passages 105 and 107 each of which extend through plate 90 are hydraulically connected by a recess channel 106 formed on the surface of the plate. Arcuate passages 108 and 110 each extending entirely through plate 90 are hydraulically connected by a recess channel 109 formed on the surface of the plate. In FIGURE 9 it will be apparent that passages 94, 95, 98, 103, 104, 105, 107, 108 and 110 extend completely through plate 90.

With plate 90 disposed in the assembly adjacent gasket 70, passage 95 will coincide with passage 74, passages 110, 108 will coincide with passages 81, 83, respectively, passage 98 will coincide with passage 77, and passages 105—107 will coincide with passages 84—86, respectively. The passages are brought into proper alignment quickly and automatically in the assembly by aligning dowel pin holes 71—91 and 72—92, respectively. Assembly holes 73—93 are automatically aligned to receive assembly bolts 65 when the dowel pin holes are aligned.

Figure 3:
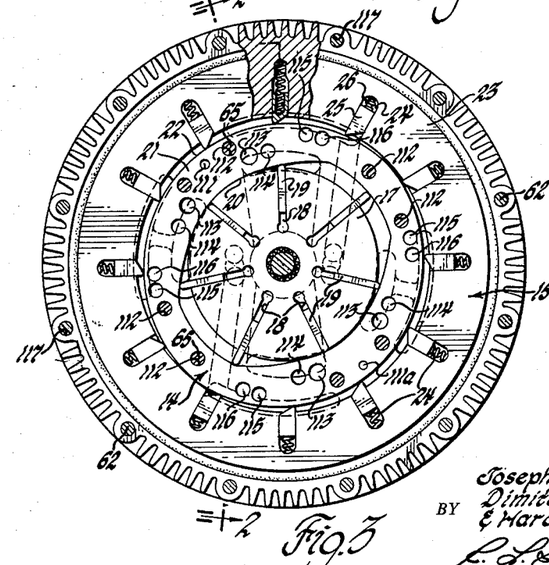
FIGURE 3 is a sectional view taken along the line 3—3 of FIGURE 2.
Figure 10:
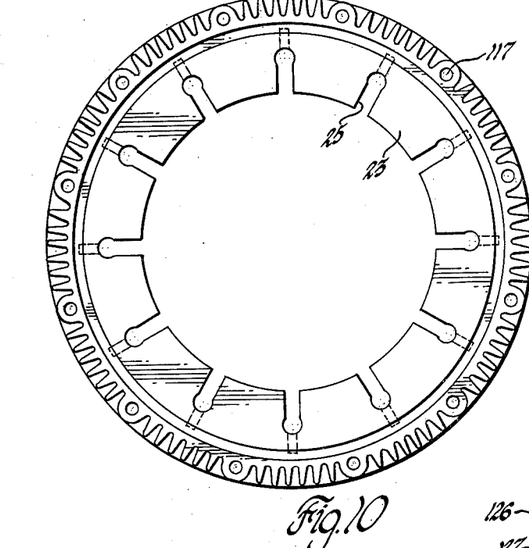
FIGURE 10 is a side view of the motor ring and the recesses for retaining the motor vanes.

Rotor housing front plate 90 is disposed in the assembly with the surface thereof illustrated in FIGURE 9 disposed adjacent rotor ring 21 and motor vane housing 23, ring 21 being shown in detail in FIGURE 3 and motor vane housing 23 in FIGURE 10. Referring to FIGURE 3, ring 21 is provided with dowel pin holes 111—111a, a series of holes 112 adapted to receive assembly bolts 65 of FIGURE 2. In addition, ring 21 has a plurality of sets of low pressure oil transfer passages 113—114 and high pressure oil transfer passages 115—116 extending therethrough, there being four sets of low pressure and four sets of high pressure transfer passages illustrated. Rotor housing 23 is provided with vane receiving slots 25 and a series of holes 117 for assembly bolts 62 of FIGURE 2. The slots 25 and holes 117 are best illustrated in FIGURE 10.

Figure 4:
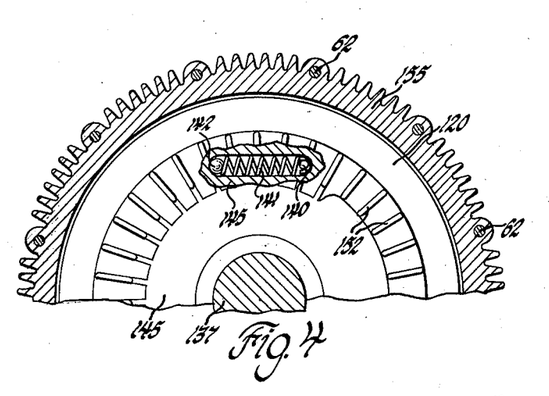
FIGURE 4 is a sectional view taken along the line 4—4 of FIGURE 2.
Figure 11:
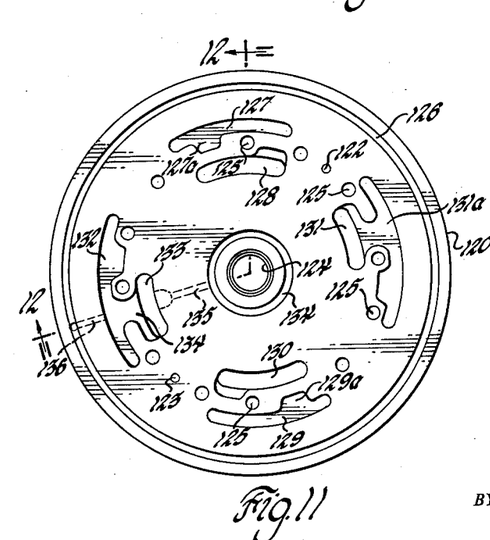
FIGURE 11 is an end view of the rotor housing rear plate illustrating the recess channels formed on one surface of the plate and the passages extending through the plate.
Figure 12:
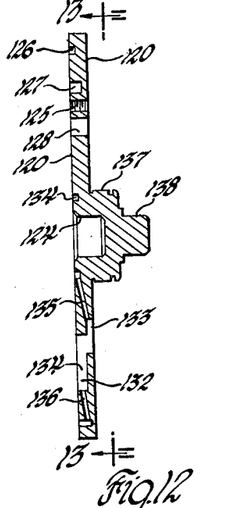
FIGURE 12 is a sectional view taken along the line 12—12 of FIGURE 11.
Figure 13:
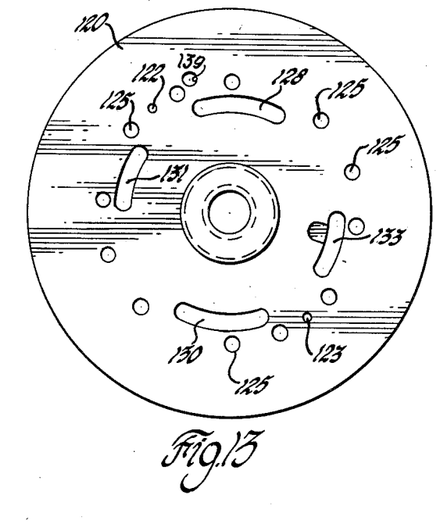
FIGURE 13 is an end view of the rotor housing rear plate illustrating the passages extending through the plate.

A rotor housing back plate 120 shown in detail in FIGURES 11 through 13 supports the inner end of shaft 16 for rotation therein by means of a bushing 121 shown in FIGURE 2. As shown particularly in FIGURE 11, back plate 120 is provided with dowel pin holes 122, 123, a central opening 124 for receiving bushing 121 and the free end of shaft 16, and a series of threaded holes 125 for receiving assembly bolts 65 of FIGURE 2. In addition back plate 120 contains an annular channel 126, and arcuate channels 127, 129, 130 and 132 formed on one face thereof. Oil transfer passages 128, 130, 131 and 133 extend through the back plate 20. An annular channel 134 is connected to oil transfer passage 133 by a passage 135. Channel 126 is connected to arcuate channel 132 by a passage 136. Annular channel 126 provides high pressure fluid to the motor vanes 25 to force the vanes into contact with cam surface 22 of ring 21. As shown particularly in FIGURE 12, a pair of axially extending bosses 137 and 138 on motor housing back plate form support surfaces for a flow control plate 145 and a roller bearing 64 shown in FIGURE 2. FIGURE 13 is a view of motor housing back plate 120 illustrating the surface of the plate opposite to that shown in FIGURE 11 showing arcuate passages 128—130 and 131—133 which extend entirely through the plate. A threaded opening 139 receives an anchor screw 140 (see FIGURE 4), screw 140 providing a reaction base for a flow control spring 141 seated on the screw 140 as shown in FIGURE 4. A ball 142 is biased by spring 141 against flow control plate 145 to rotate plate 145 with respect to rotor housing back plate to establish fluid flow from the vane pump to the vane motor. In FIGURE 13, holes 125 for assembly bolts 65, and dowel pin holes 122, 123 are shown extending entirely through plate 120.

Figure 14:
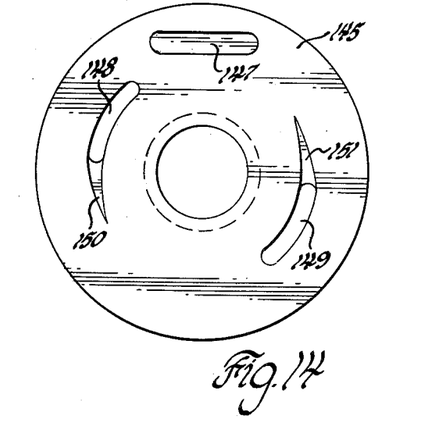
FIGURE 14 is an end view of a flow control plate illustrating the arcuate passages extending through the plate and the ramps adjacent each of the passages.
Figure 15:
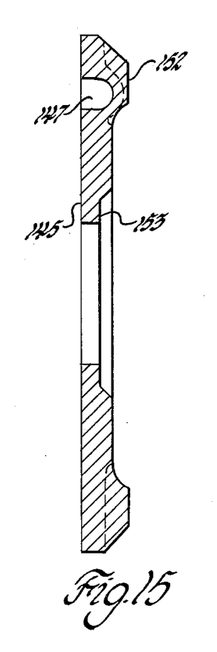
FIGURE 15 is a sectional view taken along the line 15—15 of FIGURE 16.
Figure 16:
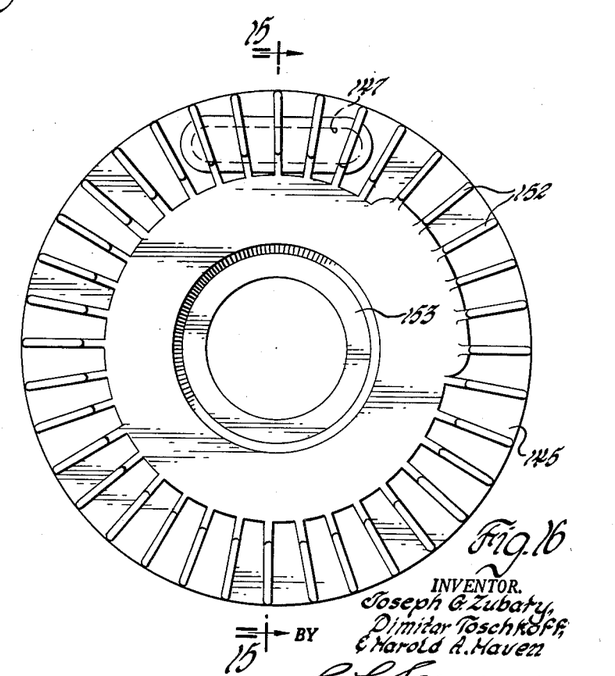
FIGURE 16 is an end view of the flow control plate illustrating the vanes formed on one surface of the plate.

A flow control plate 145, rotatably supported on boss 137 of plate 120, is shown in detail in FIGURES 14 through 16. Plate 145 is provided with a straight recess pocket 147 for receiving flow control spring 141, ball 142 and anchor screw 140 illustrated in FIGURE 4. As stated, anchor screw 140 is threaded into opening 139 of plate 120 (see FIGURE 13) and provides a reaction base for spring 141. Ball 142 of FIGURE 4 bears against the end of pocket 147 so that spring 141 normally rotates flow control plate 145 with respect to back plate 120 to establish fluid flow from the pump to the motor. As shown in FIGURE 14, flow control plate 145 has formed therein a pair of arcuate passages 148—149 extending therethrough, there being a ramp 150 adjacent the end of passage 148 and a ramp 151 adjacent the end of passage 149. As shown particularly in FIGURES 15 and 16, flow control plate 145 has a plurality of radially disposed axially extending vanes 152, preferably thirty-six in number, extending outwardly therefrom. A stepped recess 153 receives a wavy washer spring 154 shown in FIGURE 2, the spring serving to maintain control plate 145 in physical contact with one surface of rotor housing back plate 120, in the assembly. A cover 155 shown in FIGURE 2 is bolted to a power delivery pulley 160 by bolts 62. Bolts 62 extend through cover 155, motor vane housing 23 and pulley 160 so that these three elements rotate as a unit. Cover 155 has formed thereon a plurality of vanes 157, preferably thirty-six in number, disposed coaxial with and closely adjacent to vanes 152 of flow control plate 145 in the assembly as shown in FIGURE 2. Cover 155 is shaped to form a fluid chamber 158 containing flow control plate 145 and the vanes 157 of cover 155. Cover 155 is rotatably supported upon bearing 64 and pulley 160 is rotatably supported upon bearing 63. The pulley and cover are each bolted to motor vane housing 23 and support the housing. Passages 148—149 in flow control plate 145 control by-pass of pump discharge to pump suction.

In operation, unions 32 and 33 of FIGURE 2 are each hydraulically connected to a source of hydraulic fluid by pipe or hose connections, not shown. With the vehicle engine running, drive shaft 16 will rotate, causing rotation of pump rotor 17 and pump vanes 19. Housing 30, which is bolted to the engine, rotor housing shaft 37, plate 38, gasket 70, rotor housing front plate 90, rotor ring 21, rotor housing back plate 120, are fixed against rotation. Flow control plate 145 is permitted limited angular rotation with respect to back plate 120 as determined by fluid drag effective upon vanes 152 of plate 145. Cover 155, motor vane housing 23 and pulley 160 rotate as a unit at different relative speeds with respect to the speed of rotation of pump hub 17 and shaft 16.

Union 32 constitutes a suction passage for fluid entering the pump and union 33 constitutes an oil return passage for fluid returning to the sump. With shaft 16 being rotated by engine 8, pump rotor 17 and pump vanes 19 are rotated to draw oil through union 32, the bore of sleeve 37, then radially outwardly through passages 44—44a of plate 38, axially through passages 87—88 of gasket 70 and corresponding recesses 101—102 of rotor housing front plate 90 to passages 103—104 of plate 90. The fluid passes axially through passages 103—104 to the pump chamber. Passages 103—104, 107—108 of rotor housing front plate 90 are each disposed radially an equal distance from the center of the plate and in overlapping relationship with respect to low pressure oil transfer passages 113—114 of rotor ring 21 of FIGURE 2. Part of the fluid sucked by the pump vanes will pass through passages 113—114 to the right-hand side of the pump chamber adjacent rotor housing back plate 120. Passages 128—130, 131—133 of back plate 120 are disposed at the same radial distance from the center of plate 120 as passages 103—104, 107—108 of rotor housing front plate 90 and receive fluid from oil transfer passages 113—114 of rotor ring 21. Passages 148—149 of flow control plate 145 are disposed at the same radial distance from the center of the plate 145 as passages 128—130, 131—133 of back plate 120 and admit fluid to chamber 158 containing vanes 152—157.

Referring to FIGURE 8, with the pump in operation, oil supplied to the pump vanes through slots 103—104 in rotor housing front plate 90 is transmitted under pressure to slots 107—108 under pressure by the rotating pump vanes. This pressure fluid is transmitted from slot 108 to slot 110 through connecting channel 109 and from slot 107 to slot 105 through connecting channel 106. Slots 110 and 105 are diametrically opposed and supply fluid pressure to the motor vanes from the pump vanes. Referring to FIGURE 11, slots 128—130 are supplied with fluid through passages 113—114 of rotor ring 21. The rotating pump vanes will deliver fluid under pressure to slots 131—133, connected to cavities 131a and 132, respectively. Cavities 131a and 132 constitute fluid pressure supply to the motor vanes from rotor housing back plate 120. Slots 128, 130, 131 and 133 extend through plate 120 whereas cavities 127, 129, 131a and 132 are formed on one surface of the plate but do not extend through the plate. Passage 135 connects channel 134 to slot 133 in order to supply fluid to pump vane slots 18 to force the pump vanes 19 outwardly into contact with cam surface 20. Cavities 127—129 are fluid discharge cavities for discharging fluid from the motor.

Arcuate slots 148 and 149 are formed in plate 145, there being a ramp 150 adjacent slot 148 and a ramp 151 adjacent slot 149. Slots 148 and 149 are disposed radially outwardly from the center of flow control plate 145 the same distance as slots 128—130, 131—133 of rotor housing back plate 120. Plate 145 is rotatable on boss 137 of plate 120 to connect the pressure output of the pump to discharge. The degree of rotation of flow control plate 145 is a function of fluid drag in chamber 158. It will be understood that cover 155 is rotating at output speed, whereas flow control plate 145 is stationary except for the limited angular rotation permitted the plate by spring 141. Spring 141 is initially effective to position flow control plate 145 such that slots 148—149 are ineffective to connect low pressure slots 128 and 130 to pump pressure discharge passages 131 and 133. The pump is initially effective to deliver its full discharge pressure to slots 131—133 and recesses 131a—132 to drive the motor. As the speed of rotation of cover 155 increases, vanes 157 cause fluid in chamber 158 to tend to rotate, thereby imparting energy to vanes 152 tending to rotate flow control plate 145 through a limited degree of rotation against the action of spring 141. As the plate 145 rotates slots 148—149 and the ramps 150 and 151 respectively, progressively establish a fluid flow connection between pump pressure discharge slots 131—133 and pump suction passages 128 and 130, thereby progressively decreasing the pump capacity. Thus as the pump speed increases, the speed of rotation of output pulley 160 is decreased relative to the speed of rotation of the pump.

In FIGURE 11, recesses 127—129 constitute oil return passages for fluid discharged from the motor. Passages 115—116 of rotor ring 21 shown in FIGURE 3 constitute high pressure oil transfer holes through ring 21. These passages are disposed radially outwardly from the center of ring 21 the same distance as the short inwardly extending cavities 127a and 129a of FIGURE 11 and the short inwardly extending cavities 95a and 98a of FIGURE 9. Thus, oil return slots 95—98 and 127—130 are connected to each other by holes 115—116 in ring 21. Return oil flows through slots 95—98 to channels 96—99 on plate 90 and to recesses 97 and 100 respectively. Through passages 74—75—79 and 77—78—80 in gasket 70 permit the returning fluid to enter cavities 46a—46, 46b, 46c, 46d and 45a, 45, 45b, 45c, 45d on shaft housing 38. The oil is returned to the sump through passages 43—41 of FIGURE 6, and through a similar second set of such passages (not shown) formed in sleeve 37 and connected to recesses 46d, 46b, 46c.

It will be apparent from the foregoing that the pump supplies fluid to the motor axially from each side of the motor, that is, both the right and left side as viewed in FIGURE 2, and also vertically, both from above and below the axis of rotation of the motor. This provides good hydraulic balance both to the pump and motor, thereby minimizing axial thrust forces. Similarly oil return from the motor is accomplished through oil return passages positioned axially at each side of the motor and both above and below the axis of rotation of the motor for hydraulic balance.

It will also be apparent that since the motor is of a constant capacity type the speed of rotation of the motor will depend upon the quantity of fluid supplied thereto by the pump. The pump output will be a function of its speed of rotation. Due to the action of flow control plate 145 the quantity of fluid delivered to the motor is not a straight line function of pump speed but is a function of the speed of rotation of the motor. At a predetermined speed of rotation of the motor, flow control plate 145 will rotate against the force of spring 141 to partially short circuit the pump so that the motor speed will remain constant. On the other hand, with the pump speed relatively low, the speed of rotation of the motor will be relatively high with respect to the speed of rotation of the pump and may even by a ratio of 1 to 1. As the fluid drag in chamber 156 progressively rotates flow control plate 145, the pump progressively is caused to return a greater quantity of its pressure discharge to the suction side of the pump so that the actual speed of rotation of the motor may remain constant in spite of increasing speeds of rotation of the pump.

The arrangement is of compact design, of relatively simple construction and is designed for long useful life with minimum maintenance. It is particularly useful for driving vehicle engine accessories wherein it is advantageous to limit the maximum speed of rotation of such accessories in order to reduce power consumption, noise and needless wear on the accessories. At relatively low engine speeds the motor speed is substantially the same as pump speed in order to drive the accessories at a speed sufficient for the accessories to accomplish their intended function. As the engine speed and pump speed increases, the motor speed drops off relative to pump speed and may remain constant. The speed at which the motor speed becomes constant may be varied by choice of weight of spring 141. The relative speed of rotation of the motor and pump is accomplished smoothly and gradually without the engagement of any friction brakes or clutches.

We claim:

1. In a hydraulic transmission, a pump adapted to be driven at variable speeds of rotation, a fluid motor hydraulically connected to said pump and driven by said fluid discharged by said pump, said motor including a rotatable housing forming a chamber containing fluid, a by-pass passage for connecting the fluid discharged by said pump to the suction side of said pump, and means responsive to the speed of rotation of said motor for controlling said by-pass passage to limit the maximum speed of rotation of said motor to a predetermined speed.

2. In a hydraulic transmission, a pump adapted to be driven at variable speeds of rotation, a fluid motor hydraulically connected to said pump and driven by fluid discharged to said pump, a rotatable housing driven by said motor and containing fluid, a control member for controlling the quantity of fluid supplied to said motor by said pump, means yieldably biasing said control member to permit full pump discharge to be supplied to said motor, and means responsive to speed of rotation of fluid in said rotatable housing for moving said control member to increasingly diminish the quantity of fluid supplied to said motor by said pump as the speed of rotation of said rotatable housing increases to limit the maximum speed of rotation of said motor.

3. In a hydraulic transmission, a pump adapted to be driven at variable speeds of rotation, a fluid motor driven by fluid discharged from said pump, a control member movable to vary the quantity of fluid supplied to said motor by said pump, means yieldably biasing said control member to permit full pump discharge to said motor, and fluid drag responsive means for moving said control member to decrease the quantity of fluid supplied to said motor by said pump.

4. In a hydraulic transmission, a pump adapted to be driven at variable speeds of rotation, a fluid motor driven by fluid discharged by said pump, a control member for controlling the quantity of fluid supplied to said motor by said pump, said control member being rotatable through a limited degree of rotation from a first position wherein full pump discharge is admitted to said motor to a second position wherein less than full pump discharge is admitted to said pump, means yieldably biasing said control member to said first position, and fluid drag responsive means for rotating said control member to said second position.

5. In a hydraulic transmission, a pump adapted to be driven at variable speeds of rotation, a motor driven by fluid discharged by said pump, a control member for controlling the quantity of fluid supplied to said motor by said pump, a housing rotatable with said motor forming a chamber containing fluid, a series of vanes on said housing and disposed in said chamber, a series of vanes on said control member disposed in said chamber, means yieldably positioning said control member to a first position wherein full pump discharge is delivered to said motor, said housing vanes being effective to impart energy to the fluid in said chamber, the fluid in said chamber being effective to move said control member to increasingly decrease the quantity of fluid supplied to said motor as the speed of rotation of said motor increases.

6. In a hydraulic transmission, a pump adapted to be driven at variable speeds of rotation, a fluid motor driven by fluid discharged by said pump, a control member supported for rotation through a limited degree of rotation for controlling the quantity of fluid supplied to said motor, a housing rotatable with said motor and forming a chamber containing fluid, spring means yieldably biasing said control member to a position wherein full pump discharge is admitted to said motor, a plurality of vanes on said housing and control member, respectively, positioned in said chamber, said vanes and the fluid in said chamber being effective to rotate said control member against the action of said spring to decrease the quantity of fluid supplied to said motor as the speed of rotation of the motor increases.

7. In a hydraulic transmission, a pump adapted to be driven at variable speeds of rotation, a fluid motor concentrically arranged with respect to said pump and driven by fluid discharged by said pump, a housing rotatable with said motor forming a chamber, fluid in said chamber, a control member supported for limited angular rotation and disposed in said chamber in axial alignment with said pump, vanes on said housing and control member, respectively, and disposed in said chamber, spring means yieldably biasing said control member to position said control member to permit full pump discharge to said motor, said vanes being effective to rotate said control member through a limited angular rotation to increasingly decrease the quantity of fluid supplied to said motor by said pump as the speed of rotation of said motor and housing increases.

8. In a hydraulic transmission, a vane type pump adapted to be driven at variable speeds of rotation, a vane type motor concentrically arranged with respect to said pump and driven by fluid discharged by said pump, a cam ring fixed against rotation and disposed between the vanes of said pump and motor, said cam ring having one cam surface contacted by the vanes of said pump and a second cam surface contacted by the vanes of said motor, a housing driven by said motor forming a rotatable chamber at one side of said pump and motor, fluid in said chamber, a control element for controlling the quantity of fluid supplied to said motor by said pump positioned for limited angular rotation in said chamber, vanes on said housing and said control member, respectively, positioned in said chamber, spring means for rotating said control member to a position wherein full pump discharge is delivered to said motor, said vanes cooperating to rotate said control member in opposition to said spring means to increasingly decrease the flow of fluid from said pump to said motor as the speed of rotation of said motor increases.

9. In a hydraulic transmission, a pump adapted to be driven at variable speeds of rotation, a motor hydraulically connected to said pump and driven by fluid discharged by said pump, said motor including a rotatable housing forming a chamber containing fluid, a valve in said chamber for controlling the supply of fluid from said pump to said motor, means carried by said housing for rotating the fluid in said chamber in response to rotation of said housing, means yieldably positioning said valve to render said pump effective to deliver a maximum quantity of fluid to said motor, and means carried by said valve for progressively moving said valve to decrease the quantity of fluid delivered by said pump to said motor in response to increase in speed of rotation of fluid in said chamber.

10. In a hydraulic transmission, a pump adapted to be driven at variable speeds of rotation, a motor hydraulically connected to said pump and driven by fluid discharged by said pump, said motor including a rotatable housing forming a chamber containing fluid, a by-pass passage for connecting fluid discharged by said pump to the suction side of said pump, means responsive to speed of rotation of said housing for circulating the fluid in said chamber, a valve for controlling said by-pass passage, means yieldably positioning said valve to block off said by-pass passage, and means responsive to fluid circulation in said chamber for moving said valve to progressively open said by-pas passage in response to increase in speed of rotation of said housing.

11. In a hydraulic transmission, a pump adapted to be driven at variable speeds of rotation, a fluid motor hydraulically connected to said pump and driven by fluid discharged by said pump, said motor including a rotatable housing forming a chamber containing fluid, means carried by said housing for circulating fluid in said chamber, a control member disposed in said chamber and movable to vary the quantity of fluid supplied to said motor by said pump, means yieldably biasing said control member to permit full pump discharge to said motor, and means carried by said control member responsive to fluid circulation in said chamber for moving said control member to decrease the quantity of fluid supplied to said motor by said pump in response to increase in speed of rotation of said housing.

12. In a hydraulic transmission, a pump adapted to be driven at variable speeds of rotation, a fluid motor hydraulically connected to said pump and driven by fluid discharged by said pump, said motor including a rotatable housing forming a chamber containing fluid, means carried by said housing for circulating fluid in said chamber in response to rotation of said housing, a control member disposed in said chamber for controlling the quantity of fluid supplied to said motor by said pump, said control member being rotatable through a limited angular rotation from a first position wherein fluid is delivered to said motor at full pump capacity to a second position wherein fluid is delivered to the motor at a rate less than full pump capacity, means disposed in said chamber yieldably biasing said control member to said first position, and means carried by said control member and responsive to circulating fluid in said chamber for rotating said control member from said first position to said second position.

13. In a hydraulic transmission, a pump adapted to be driven at variable speeds of rotation, a fluid motor hydraulically connected to and driven by fluid discharged from said pump, a control member for controlling the quantity of fluid supplied to said motor by said pump, a rotatable housing driven by said motor forming a chamber containing fluid, a series of vanes formed on said housing and disposed in said chamber, a series of vanes on said control member disposed in said chamber, means yieldably biasing said control member to a first position wherein full pump discharge is delivered to said motor, the fluid in said chamber being effective to move said control member to increasingly decreases the quantity of fluid supplied to said motor as the speed of rotation of said motor increases.

14. In a hydraulic transmission, a pump adapted to be driven at variable speeds of rotation, a fluid motor hydraulically connected to said pump and driven by fluid discharged by said pump, a rotatable housing driven by said motor forming a chamber containing fluid, means driven by said motor for circulating the fluid in said chamber, a valve plate disposed in said chamber for controlling the rate of fluid discharge of said pump, spring means for positioning said valve plate to a first position for maximum rate of fluid discharge of said pump to said motor, and means carried by said valve plate responsive to fluid circulated in said chamber for progressively moving said valve plate to decrease the rate of fluid discharge from said pump to said motor in response to increase in circulation of fluid in said chamber.

15. In a hydraulic transmission, a pump adapted to be driven at variable speeds of rotation, a fluid motor hydraulically connected to said pump and driven by fluid discharged by said pump, a rotatable housing driven by said motor forming a chamber containing fluid, vanes on said housing for circulating fluid in said chamber, a valve plate positioned in said chamber for limited angular rotation with respect to said pump and adapted to control the rate of fluid discharge from said pump to said motor, spring means for positioning said valve plate for maximum rate of fluid discharge from said pump to said motor, and vanes on said valve plate responsive to fluid circulated in said chamber for progressively decreasing the rate of fluid discharge from said pump to said motor in response to increase in circulation of fluid in said chamber.

16. In a hydraulic transmission, a vane type pump adapted to be driven at variable speeds of rotation, a vane type motor concentrically arranged with respect to said pump and driven by fluid discharged by said pump, said pump and motor including a cam ring fixed against rotation and disposed between the vanes of said pump and motor, respectively, said cam ring including one cam surface contacted by said pump vanes and a second cam surface contacted by said motor vanes, a housing driven by said motor forming a rotatable chamber at one side of said pump and motor, fluid in said chamber, a rotatable control element for controlling the quantity of fluid supplied to said motor by said pump positioned for limited angular rotation in said chamber, vanes on said housing and said control member, respectively, positioned in said chamber, spring means for rotating said control element to a position wherein maximum pump discharge is delivered to said motor, said vanes cooperating to rotate said control member in opposition to said spring means to progressively decrease the flow of fluid from said pump to said motor in response to increase in speed of rotation of said motor.

17. In a hydraulic transmission, a pump adapted to be driven at variable speeds of rotation, a fluid motor hydraulically connected to said pump and driven by fluid discharged by said pump, a control member supported for rotation through a limited degree of angular rotation for controlling the quantity of fluid supplied to said motor by said pump, a housing member driven by said motor and forming a chamber containing fluid, a spring yieldably biasing said rotatable control member to a position wherein full pump discharge is delivered to said motor, a plurality of vanes on said housing and said control member respectively, positioned in said chamber, said vanes and the fluid in said chamber being effective to rotate said control member against the action of said spring to decrease the quantity of fluid supplied to said motor as the speed of rotation of the motor increases.

18. In a hydraulic transmission, a pump adapted to be driven at variables speeds of rotation, a fluid motor concentrically arranged with respect to said motor and driven by fluid discharged by said pump, a housing rotatable with said motor forming a chamber containing fluid, a rotatable control member supported for limited angular rotation and positioned in said chamber in axial alignment with said pump, vanes on said housing and said control member, respectively, and disposed in said chamber, spring means yieldably biasing said rotatable control member to position said control member to permit full pump discharge to said motor, said vanes being effective upon rotation of said housing to rotate said rotatable control member through a limited angular rotation to decrease the quantity of fluid supplied to said motor by said pump as the speed of rotation of said motor and housing increases.

References Cited in the file of this patent
UNITED STATES PATENTS

| | | |
|---|---|---|
| 1,318,143 | Haffner | Oct. 7, 1919 |
| 2,291,011 | Vickers | July 28, 1942 |
| 2,609,665 | Rappl | Sept. 9, 1952 |
| 2,690,712 | Foote | Oct. 5, 1954 |
| 2,803,112 | Salder et al. | Aug. 20, 1957 |
| 2,973,714 | Oishei | Mar. 7, 1961 |